United States Patent
Podszun et al.

[19]

[11] Patent Number: 6,150,733
[45] Date of Patent: Nov. 21, 2000

[54] METHOD AND DEVICE FOR INFLUENCING AN IMPRESSION WHICH IS SUBJECTIVELY PERCEIVED BY AN OCCUPANT OF A VEHICLE, IN PARTICULAR OF A PASSENGER CAR, WHEN THE VEHICLE IS BEING OPERATED

[75] Inventors: Werner Podszun, Nuertingen; Klaus Genuit, Aachen, both of Germany

[73] Assignees: DaimlerChrysler AG, Stuttgart, Germany; Head acoustics GmbH, Herzogenrath-Kohlscheid, Germany

[21] Appl. No.: 09/188,676

[22] Filed: Nov. 10, 1998

[30] Foreign Application Priority Data

Nov. 10, 1997 [DE] Germany .............. 197 49 587

[51] Int. Cl.⁷ .................................................. B60L 1/00
[52] U.S. Cl. ................... 307/10.1; 248/636; 261/140.11; 381/71.4; 381/71.8; 381/89
[58] Field of Search .................. 307/10.1; 381/71.1, 381/71.4, 86, 89, 332, 71.8; 267/140.1; 248/636

[56] References Cited

U.S. PATENT DOCUMENTS

| | | |
|---|---|---|
| 4,562,589 | 12/1985 | Warnaka et al. .............. 381/71.4 |
| 4,869,474 | 9/1989 | Best et al. ................... 267/140.1 |
| 5,063,598 | 11/1991 | Geddes . |
| 5,146,505 | 9/1992 | Pffaf et al. ..................... 381/86 |
| 5,219,037 | 6/1993 | Smith et al. ................. 180/312 |
| 5,332,061 | 7/1994 | Majeed et al. . |
| 5,434,783 | 7/1995 | Pal et al. . |
| 5,848,168 | 12/1998 | Shipps et al. ................ 381/71.8 |

FOREIGN PATENT DOCUMENTS

| | | |
|---|---|---|
| 42 19 648 A1 | 1/1993 | Germany . |
| 197 14 724 A1 | 11/1997 | Germany . |

*Primary Examiner*—Albert W. Paladini
*Attorney, Agent, or Firm*—Evenson, McKeown, Edwards & Lenahan, P.L.L.C

[57] ABSTRACT

A method and device are provided for influencing an impression which is subjectively perceived by an occupant of a vehicle, in particular of a passenger car, when the vehicle is being operated. The primary oscillations which are produced when the vehicle is being operated are determined. Data for secondary oscillations are acquired from the primary oscillations and are converted at least in part into vibration oscillations which can be perceived through the human body. At least one of the components of the vehicle body is excited using the vibration oscillations, the vibration oscillations being placed in an interference relationship with the primary oscillations. In particular, the steering wheel is also excited so as to undergo mechanical vibration oscillations.

34 Claims, 1 Drawing Sheet

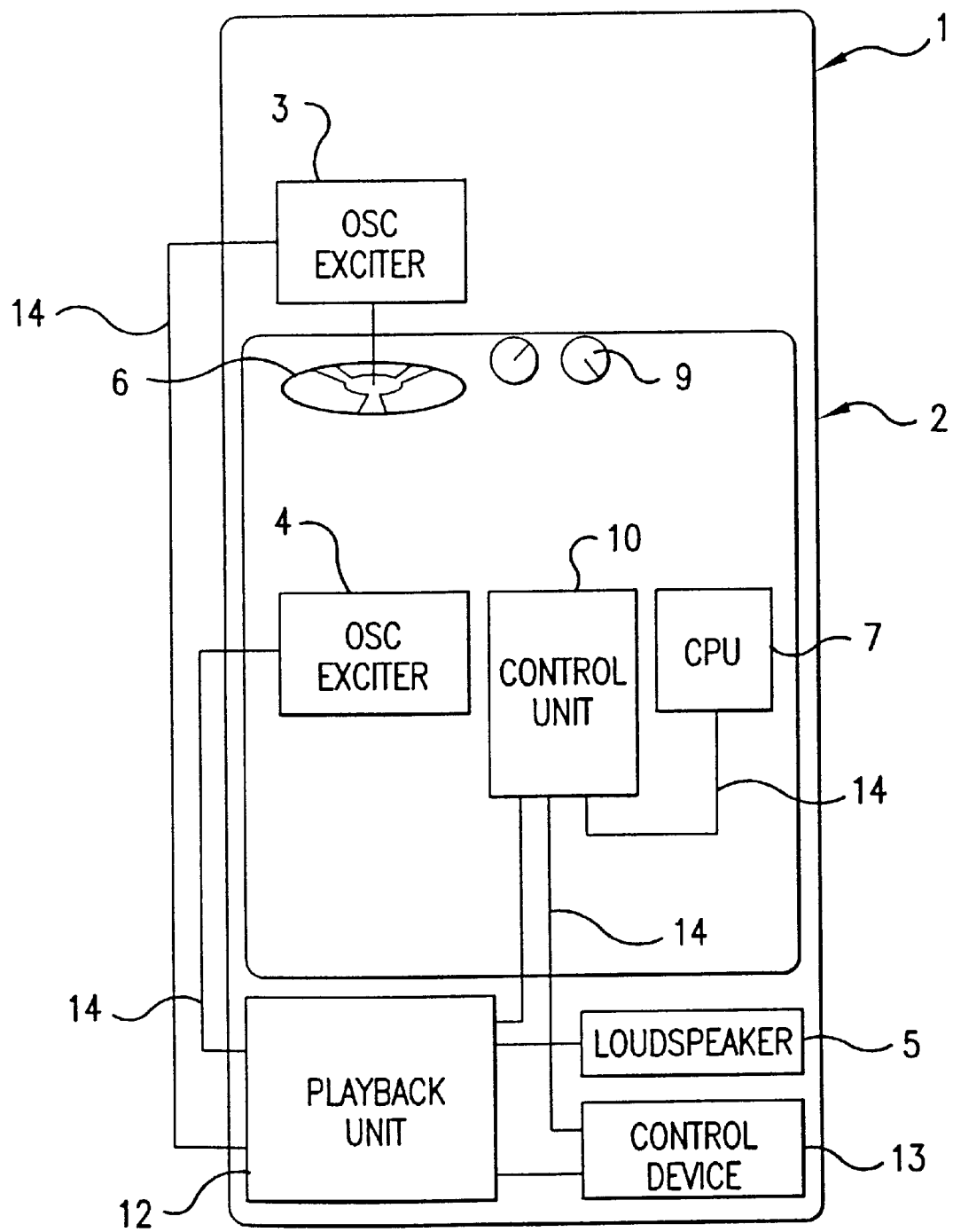

METHOD AND DEVICE FOR INFLUENCING AN IMPRESSION WHICH IS SUBJECTIVELY PERCEIVED BY AN OCCUPANT OF A VEHICLE, IN PARTICULAR OF A PASSENGER CAR, WHEN THE VEHICLE IS BEING OPERATED

CROSS-REFERENCE TO RELATED APPLICATIONS

This application is related to application Ser. No. 09/88298 now U.S. Pat. No. 6,035,720, filed Nov. 10, 1998 and entitled "Method And Device For Simulating An Impression Which Is Subjectively Perceived By An Occupant Of A Vehicle, In Particular Of A Passenger Car, When The Vehicle Is Being Operated".

BACKGROUND AND SUMMARY OF THE INVENTION

This application claims the priority of German Application No. 197 49 587.7, filed Nov. 10, 1997, the disclosure of which is expressly incorporated by reference herein.

The invention relates to a method and a device for influencing an impression which is subjectively perceived by an occupant of a vehicle, in particular of a passenger car, when the vehicle is being operated. A known method of this type is described in U.S. Pat. No. 5,332,061, the specification of which is incorporated herein by reference.

U.S. Pat. No. 5,332,061 discloses a method for suppressing vibrations which are induced in the body of a vehicle, as well as disclosing a corresponding vehicle in which the method is practiced. The respective induced vibrations originate from the engine and are transmitted to the points where the engine connects to the body of a vehicle. In order to suppress these vibrations, the vehicle has shakers, that is to say mechanical vibration exciters, which are arranged in the region of at least a number of connection points between the engine and the body of the vehicle. When the engine is operated, the shakers are excited as a function of the rotational speed of the engine at the resonant frequencies in antiphase with respect to vibrations coming from the engine, thus causing the transmission of the induced vibrations to be at least attenuated. The corresponding frequencies and their amplitudes for the secondary oscillations are obtained here from a previously written data field.

U.S. Pat. No. 5,434,783 A1 discloses a vehicle in which the background noise which can be heard within a passenger cell is influenced by sound waves. In addition to normal loudspeakers, use is also made here of a piezoelement which excites at least parts of the vehicle body to oscillate and thus influences it so as to emit sound waves; i.e. the piezoelement acts like a coil of a loudspeaker, while the vehicle body represents the oscillating diaphragm. The previously known method and device make it possible to improve the subjective sensation within the passenger cell.

The object of the invention is therefore to develop further the basic method and device in such a way that the subjective sensation of impressions is improved upon.

This and other objects are achieved by a method for influencing an impression which is subjectively perceived by an occupant of a vehicle, in particular of a passenger car, when the vehicle is operating, in which primary oscillations are produced and determined when the vehicle is operating. Furthermore, data which are acquired for secondary oscillations are artificially generated from the primary oscillations. Vibration oscillations which can be subjectively perceived through the human body are generated artificially as at least part of the secondary oscillations. At least one of the components of the vehicle body is excited using the vibration oscillations. The vibration oscillations are placed in an interference relationship with at least some of the frequencies of the primary oscillations, and at least certain frequencies of the primary oscillations which are produced while the vehicle is operating are changed by the interference. The steering wheel is excited so as to undergo mechanical vibration oscillations. The vibration oscillations of the steering wheel are those subjected to interference by the primary oscillations. A device is also provided for influencing an impression which is subjectively perceived by an occupant of a vehicle, in particular of a passenger car, when the vehicle is being operated, using oscillation exciters with which secondary oscillations can be artificially generated when the vehicle is being operated. In this case, at least certain frequencies are reduced or, if appropriate, also increased due to interference of the secondary oscillations with the primary oscillations produced while the vehicle is operating. A vibration exciter which induces vibration oscillations which can be perceived through the human body is assigned to the steering wheel. The steering wheel can therefore be excited to undergo vibration oscillations which can be perceived through the human body, using the oscillation exciter.

By influencing the vibrations perceived by the body of the vehicle occupant or occupants it is possible to improve in a relatively simple way not only the acoustically perceived subjective impression but also the overall impression. Vibrations perceived by the body are understood to be oscillations which a person notices, for example, as a result of shaking of the steering wheel, rocking or shaking of the seat etc. The steering wheel is also, in particular, advantageously assigned an oscillation exciter which excites vibration oscillations. It is particularly surprising here that certain impressions cannot be sensed at all unless corresponding vibration oscillations are excited in the steering wheel. If, on the other hand, the steering wheel is not excited, a completely different impression is produced. As a result of the fact that the vibration oscillations which act at least in part as counter-oscillations are induced in the region of at least the driver's seat and/or of the steering wheel, the results of the interference act precisely on one particular vehicle occupant. Their influence on the vehicle body is at most small so that the driving safety of the vehicle is not affected, for which reason it is also impossible for it to be adversely influenced. The generation of the vibration oscillations can take place in a way which is analagous to the method known from the field of active-noise reduction so that more precise details on this are not necessary. The improvement can include amplifying certain frequencies or frequency patterns or, in particular, suppressing them, and relates not only to the vibrations which can be perceived through the human body and are noticed by the driver and/or the vehicle occupants. Here, frequency pattern is understood to be a large number of the frequencies which have, for example, a specific envelope curve or also a specific Fourier spectrum, for example. The respective frequencies may be due, for example, to the engine, the chassis, the tires, the condition of the road or else to the activation of the windscreen wiper or fan.

For a simple embodiment of the invention, it may be sufficient to influence satisfactorily the subjectively perceived vibrations if frequencies up to 150 Hz are gated out, for example, by means of a low-pass filter, from the airborne sound signal which can be recorded, for example, by means of one or more microphones. The vibration oscillations are then generated with the gated-out low-frequency component. The signals which cause the vibration oscillations are used, in particular, to actuate oscillation exciters which are arranged in the steering gear and/or on the seat rail. Additionally, it is particularly advantageous to actuate a low-frequency loudspeaker with modified signals. The speaker then covers the low-frequency component of the acoustic airborne sound.

Other objects, advantages and novel features of the present invention will become apparent from the following detailed description of the invention when considered in conjunction with the accompanying drawings.

BRIEF DESCRIPTION OF THE DRAWING

The single FIGURE is a diagrammatic representation of a passenger car which has various devices for influencing subjective impressions which are perceived by an occupant of the passenger car when the vehicle is being operated.

DETAILED DESCRIPTION OF THE DRAWING

In order to ensure the desired influencing of the impressions perceived by the vehicle occupant, the following components are arranged in and/or on the vehicle body: an electrodynamic oscillation exciter 3 arranged in the region of the engine cavity and on the steering gear, a computer unit 7 for detecting and determining the primary oscillations and for generating the secondary oscillations, a control unit 10 for setting the desired influence on the primary oscillations, an electrodynamic oscillation exciter 4 for inducing vibration oscillations in the seat, a playback unit 12 with an amplifier and equalizer for the secondary oscillations and the vibration oscillations which are correlated with the secondary oscillation, and an electronic control device 13 for actuating the aforesaid components which are connected to it via the leads 14.

Apart from the above components, the simulation unit also has large speakers (not shown) which are associated with an acoustic-influencing system known under the specialist term "active noise control" or ANC (see U.S. Pat. No. 5,063,598, for example).

In contrast to the sensors and loudspeakers which are associated with the ANC system, the sensors and oscillation exciters which are treated here and are arranged on and/or in the vehicle body and, in this context, in particular in the passenger compartment, are configured at least primarily not for frequencies and exciter characteristics which relate to acoustic perception, but rather much more to those which are perceived by the body of a vehicle occupant and are referred to here as vibrations. In particular, these are oscillations with frequencies below 150 Hz.

In order to cover this frequency range in terms of airborne sounds, a low-frequency loudspeaker 5 (subwoofer) is arranged within the passenger compartment 2 of the vehicle 1. The sound waves which are generated with the low-frequency loudspeaker 5 can also be perceived through the human body, depending on the sound pressure. In the case of these soundwaves, the region of airborne sound and structure-borne sound thus intersect in terms of oscillations perceivable by the human body.

In order to excite the seat to undergo vibration oscillations, the oscillation exciter 4 (which is assigned at least to the seat) is arranged in particular in a freely oscillating fashion in the region of the seat, of a seat rail, of the vehicle body 1 and/or of the floor panel. The oscillation exciter 3 which is assigned to the steering wheel 6 is preferably rigidly arranged in a convenient fashion in the region of the steering gear. The oscillation exciters 4, 3, which are at a minimum indirectly assigned during operation to the seat and to the steering wheel 6, can be used to generate vibration oscillations and induce them in the seat and/or in the steering wheel 6.

The electrodynamic oscillation exciter 3 which is assigned to the steering wheel is preferably an electric motor. In a preferred embodiment, the exciter 3 is in particular a D.C. motor. The vibration oscillations are induced in the Z direction, preferably as rotary oscillations of the steering wheel 6.

The artificially generated vibration oscillations are ideally in antiphase with respect to the primary oscillations which are produced when the vehicle is being operated. As a result of the induced artificially generated vibration oscillations, the component of the primary oscillations which can be perceived by the body is, in the most favorable case, cancelled out by negative interference. As a result, the driver, at most, only perceives the oscillations to a small degree through the seat and through the steering wheel 6.

So that a further point at which such oscillations are perceived is at least reduced, it is favorable also to provide such oscillation exciters in regions of the floor plate at which the feet of the driver and possibly also of other vehicle occupants are generally located.

A method for influencing the subjective impression in virtually real-time is described below. When the passenger car is operated, the passenger car is excited in various ways so as to undergo primary oscillations which are subjectively perceived by a vehicle occupant. The primary oscillations have, inter alia, an acoustic component (approximately 16 Hz–16 kHz) and a low-frequency component—the vibration. In particular, this includes vibrations at frequencies between 0.5 and 150 Hz. The primary oscillations are determined by different types of detectors, in particular between 0.1 Hz and 20 kHz, preferably between 1 Hz and 16 kHz, and most preferably between 5 Hz and 16 kHz, and are evaluated in a known fashion using the electronic computer unit 7.

In terms of the component of the primary oscillations which can be perceived through the human body, the vibrations of the seat and of the steering wheel 6, inter alia, are advantageously measured. The measurement of the vibrations is carried out expediently using acceleration and/or speed and/or displacement sensors in a known fashion.

The primary oscillations can be determined in a more costly, but also more precise, way by the use of, in particular, multi-channel technology in which both the acoustically perceptible oscillations and also the vibrations (in particular in the seat and at the steering wheel 6) are registered.

A response signal is generated for the vibration oscillations from the values which are determined; however, only frequencies up to 150 Hz are taken into account for this. The response signal is used to actuate the different oscillation exciters 3, 4 which are responsible for the vibration oscillations and which themselves then cause the seat and the steering wheel 6 to undergo vibration oscillations, and also via the air column in the passenger compartment 2 of the vehicle with the aid of the low-frequency loudspeaker 5.

Depending on the application, the subjective impression of the vibrations which can be perceived through the human body is thus reduced or else even amplified. The influence on the component of the primary oscillations which can be perceived through the human body is exerted through interference (superimposition) using the artificially generated vibration oscillations in the range of actual perception of the vehicle occupants.

Whereas positive interference preferably makes it possible to impart a specific driving impression, negative interference increases, in particular, the subjective quietness of driving and thus the comfort.

In contrast with the real-time method of exerting influence represented above, it is also possible to use a method in which the values for the response signal are obtained from a data record which has previously been written. However, this data record does not necessarily have to be retained continuously but can also continuously be expanded in a learning fashion given appropriate programming. To this end, the primary oscillations which occur during particularly precisely predefined operations are registered and converted into a storable primary data record.

Those data which are assigned to the vibration oscillations which can be perceived through the human body are extracted, as vibration data record, from the primary data record which has, if appropriate, been in particular electronically buffered. The vibrations can thus be converted at any time into a corresponding response signal in order to generate the vibration oscillations.

It is expedient here that the vibration oscillations are generated and/or induced as a function of at least one parameter. Preferably the travel speed and/or the rotational speed are used as parameters.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for controlling initial perceptible oscillations which are in a frequency range able to be perceivable by a human body and which are produced in a zone of an interior of a vehicle wherein said initial perceptible oscillations are produced by an operation of said vehicle, the method comprising the acts of:
    artificially generating secondary oscillations data from the initial perceptible oscillations;
    artificially generating vibration oscillations as a function of the secondary oscillations data;
    exciting at least one component of a body of the vehicle using the vibration oscillations;
    placing the vibration oscillations in an interference relationship with at least determined frequencies of the initial perceptible oscillations, such that at least the determined frequencies of the initial perceptible oscillations produced while the vehicle is operating are changed by the interference; and
    wherein a steering wheel of the vehicle is excited so as to undergo mechanical vibration oscillations, said mechanical vibration oscillations of the steering wheel being subjected to the interference with the initial perceptible oscillations.

2. The method according to claim 1, wherein vibration oscillations are formed from said component of the initial perceptible oscillations.

3. The method according to claim 1, wherein the primary oscillations are determined in a frequency band between 0.1 Hz and 20 kHz.

4. The method according to claim 1, wherein the primary oscillations are determined in a frequency band between 1 Hz and 16 kHz.

5. The method according to claim 1, wherein the primary oscillations are determined in a frequency band between 5 Hz and 16 kHz.

6. The method according to claim 1, wherein, in order to generate vibration oscillations, sample values are extracted from a data field, which data field has been previously written and determined from the initial perceptible oscillations, and wherein said sample values are converted into the vibration oscillations.

7. The method according to claim 1, wherein the vibration oscillations are extracted from a previously written data field as a function of at least one parameter.

8. The method according to claim 7, wherein the parameter used is at least one of the speed, the rotational speed and the acceleration of the vehicle.

9. The method according to claim 1, wherein the initial perceptible oscillations are registered and converted into a primary data record, and wherein those data which are assigned to the vibration oscillations are extracted, as a vibration data record, from the primary data record, and further wherein the vibration data record is converted into vibration oscillations.

10. The method according to claim 9, wherein the primary data record is stored on a data carrier.

11. The method according to claim 1, wherein appropriate vibration oscillations are determined from the initial perceptible oscillations, and wherein a vibration data record is copied from the primary data record, and further wherein, in order to generate acoustic secondary oscillations, the data of the vibration data record also remains in the primary data record.

12. The method according to claim 1, wherein the vibration oscillations are at least one of induced directly at the steering gear and induced directly at the steering wheel.

13. The method according to claim 1, wherein only oscillations of a maximum frequency of 300 Hz are induced as vibration oscillations.

14. The method according to claim 1, wherein only oscillations of a maximum frequency of 200 Hz are induced as vibration oscillations.

15. The method according to claim 1, wherein only oscillations of a maximum frequency of 150 Hz are induced as vibration oscillations.

16. The method according to claim 1, wherein the primary data record is formed only from acoustically determined oscillations.

17. The method according to claim 1, wherein vibrations of the steering wheel are registered in order to determine a primary data record.

18. The method according to claim 1, wherein in order to determine a primary data record using multi-channel technology, both acoustically perceptible oscillations and vibrations at the steering wheel and/or at the seats are registered.

19. The method according to claim 1, wherein the vibrations are registered with at least one of acceleration, speed and displacement sensors.

20. The method according to claim 1, wherein a low-frequency loudspeaker is operated with acoustic secondary oscillations which are less than 300 Hz.

21. The method according to claim 1, wherein a low-frequency loudspeaker is operated with acoustic secondary oscillations which are less than 200 Hz.

22. The method according to claim 1, wherein a low-frequency loudspeaker is operated with acoustic secondary oscillations which are less than 150 Hz.

23. The method according to claim 1, wherein an electrodynamic oscillation exciter which induces assigned vibration oscillations into the steering wheel is operated with the data of a vibration data record which are assigned to the steering wheel.

24. A device for controlling initial perceptible oscillations which are in a frequency range able to be perceived by a human body and which are produced in a zone of an interior of a vehicle wherein said perceptible oscillations are produced by an operation of said vehicle, the device comprising:

a vibration exciter operatively coupled to a steering wheel of the vehicle in order to excite the steering wheel to undergo determined vibration oscillations;

wherein the determined vibration oscillations are made to interfere with the initial perceptible oscillations produced while the vehicle is operating in order to at least one of reduce determined frequencies of the primary oscillations and increase determined frequencies of the initial perceptible oscillations.

25. The device according to claim 24, further comprising a low-frequency loud speaker which produces low-frequency sound waves for interference with vehicle body borne sound waves.

26. The device according to claim 24, wherein the vibration exciter is an electrodynamic oscillation exciter.

27. The device according to claim 24, wherein the vibration exciter assigned to the steering wheel is an electric motor.

28. The device according to claim 27, wherein the electric motor is a D.C. motor.

29. A method for controlling initial perceptible oscillations which are in a frequency range able to be perceived by a human body and which are produced in a zone of an interior of a vehicle wherein said perceptible oscillations are produced by an operation of said vehicle, the method comprising the acts of:

processing the perceptible oscillations to artificially generate data for producing secondary oscillations;

exciting a steering wheel of the vehicle so as to undergo mechanical vibration oscillations based on the data for producing the secondary oscillations;

interfering the vibration oscillations of the steering wheel with the initial perceptible oscillations of the vehicle such that at least certain frequencies of the primary oscillations are changed due to the interference.

30. The method according to claim 29, wherein the processing act further comprises the acts of:

one of extracting and copying a component of the initial perceptible oscillations;

forming the vibration oscillations based on the component of the initial perceptible oscillations.

31. The method according to claim 29, wherein the act of processing further comprises the act of determining the primary oscillations in a frequency band between 0.1 Hz and 20 KHz.

32. The method according to claim 29, wherein the act of processing the initial perceptible oscillations further comprises the acts of:

predetermining a data field of determined vibration oscillations from the initial perceptible oscillations; and extracting from the data field sample values for vibration oscillations, which sample values are converted into the determined vibration oscillations.

33. The method according to claim 32, wherein the act of extracting the sample values further comprises the act of extracting the sample values from a predetermined data field as a function of at least one parameter of the vehicle.

34. The method according to claim 33, wherein the parameter is at least one of a speed, a rotational speed, and an acceleration of the vehicle.

* * * * *